(12) United States Patent
Kanamori et al.

(10) Patent No.: US 11,975,682 B2
(45) Date of Patent: May 7, 2024

(54) POWER TRANSMISSION MEMBER, PRETENSIONER, RETRACTOR, AND METHOD FOR MANUFACTURING POWER TRANSMISSION MEMBER

(71) Applicant: JOYSON SAFETY SYSTEMS JAPAN K.K., Tokyo (JP)

(72) Inventors: Yasushi Kanamori, Shiga (JP); Kiyoshi Watanabe, Shiga (JP)

(73) Assignee: Joyson Safety Systems Japan G.K. (JP)

( * ) Notice: Subject to any disclaimer, the term of this patent is extended or adjusted under 35 U.S.C. 154(b) by 439 days.

(21) Appl. No.: 17/292,220

(22) PCT Filed: Oct. 14, 2019

(86) PCT No.: PCT/JP2019/040350
§ 371 (c)(1),
(2) Date: May 7, 2021

(87) PCT Pub. No.: WO2020/095625
PCT Pub. Date: May 14, 2020

(65) Prior Publication Data
US 2022/0001834 A1  Jan. 6, 2022

(30) Foreign Application Priority Data
Nov. 9, 2018 (JP) ................................ 2018-211762

(51) Int. Cl.
*B60R 22/46* (2006.01)

(52) U.S. Cl.
CPC .. *B60R 22/4633* (2013.01); *B60R 2022/4642* (2013.01)

(58) Field of Classification Search
CPC ................ B60R 22/46; B60R 22/4633; B60R 2022/4642; C08L 29/14
See application file for complete search history.

(56) References Cited

U.S. PATENT DOCUMENTS 9,273,156 B2 * 3/2016 Takatori .................... C08F 2/32
9,555,768 B2   1/2017 Gray et al.
(Continued)

FOREIGN PATENT DOCUMENTS

DE   10 2006 015 345 A1   10/2007
DE   10 2011 016 153 A1   10/2012
(Continued)

OTHER PUBLICATIONS

International Searching Authority, "International Search Report," issued in connection with International Patent Application No. PCT/JP2019/040350, dated Dec. 10, 2019.
(Continued)

*Primary Examiner* — Sang K Kim
(74) *Attorney, Agent, or Firm* — Foley & Lardner LLP (57) ABSTRACT

A power transmission member including a base resin that has a water absorption characteristic that a water absorption rate is 1% or less when Method 1 of ISO 62 (a method for measuring a weight increasing rate after being immersed in water at 23° C. for 24 hours) is used and an elastomer that imparts mechanical characteristics to the power transmission member 32a, in which as the mechanical characteristics, tensile yield stress (ISO 527) is 40 to 54 MPa, tensile fracture strain (ISO 527) is 50% or more, tensile elastic modulus (ISO 527) is 1200 to 1900 MPa, bending elastic modulus (ISO 178) is 1100 to 1700 MPa, and unnotched Charpy impact strength (ISO 179) is no fracture at −30° C. or higher.

10 Claims, 5 Drawing Sheets

(56) References Cited

U.S. PATENT DOCUMENTS

| | | |
|---|---|---|
| 9,744,940 B1 | 8/2017 | Kohlndorfer et al. |
| 9,908,503 B2 | 3/2018 | Gentner et al. |
| 2007/0264514 A1 | 11/2007 | Prigandt et al. |
| 2014/0014758 A1 | 1/2014 | Gentner et al. |
| 2018/0065595 A1* | 3/2018 | Yoshioka ............ B60R 22/4628 |
| 2018/0178752 A1* | 6/2018 | Yoshioka ............ B60R 22/4628 |

FOREIGN PATENT DOCUMENTS

| | | |
|---|---|---|
| JP | H08-192722 A | 7/1996 |
| JP | 2005-187591 A | 7/2005 |
| JP | 2008-514461 A | 5/2008 |
| JP | 2014-201155 A | 10/2014 |
| JP | 2015-217729 A | 12/2015 |
| WO | WO-2017/180833 A1 | 10/2017 |

OTHER PUBLICATIONS

International Searching Authority, "Written Opinion," issued in connection with International Patent Application No. PCT/JP2019/040350, dated Dec. 10, 2019.

* cited by examiner

POWER TRANSMISSION MEMBER, PRETENSIONER, RETRACTOR, AND METHOD FOR MANUFACTURING POWER TRANSMISSION MEMBER

CROSS-REFERENCE TO RELATED APPLICATIONS

The present application claims priority under 37 U.S.C. § 371 to International Patent Application No. PCT/JP2019/040350, filed Oct. 14, 2019, which claims priority to and the benefit of Japanese Patent Application No. 2018-211762, filed on Nov. 9, 2018. The contents of these applications are hereby incorporated by reference in their entireties.

TECHNICAL FIELD

The present invention relates to a power transmission member, a pretensioner, a retractor, and a method for manufacturing the power transmission member, and in particular, a power transmission member that is made of resin and rotates a gear while being plastically deformed, a pretensioner and a retractor using the power transmission member, and a method for manufacturing the power transmission member.

BACKGROUND ART

In a vehicle such as an automobile and the like, a seat belt device that restrains an occupant in a seat including a seat portion on which the occupant sits and a backrest portion located on the back surface of the occupant is generally provided. Such a seat belt device includes a webbing that restrains an occupant, a retractor that winds the webbing, a buckle arranged on the side surface of a seat, and a tongue arranged on the webbing and restrains the occupant in the seat by fitting the tongue to the buckle.

Also, the retractor is generally provided with a pretensioner that removes slack in the webbing in an emergency such as a vehicle collision and the like (see, for example, Patent Literature 1, Patent Literature 2, and the like). In such a pretensioner, in recent years, a power transmission mechanism that makes a resin-made elongated rod-shaped power transmission member to collide with a gear (sometimes referred to as a pinion, a ring gear, a drive wheel, and the like) connected to a spool to rotate the gear while being plastically deformed is being researched and developed.

For example, Patent Literature 1 discloses that the power transmission member (rack) is formed of a soft resin material such as nylon (PA), polyvinyl chloride (PVC), an elastomer, or the like. Also, Patent Literature 2 discloses that the power transmission member is formed of a homopolymer of POM resin.

CITATION LIST

Patent Literature

Patent Literature 1: JP 2014-201155 A
Patent Literature 2: JP 2015-217729 A

SUMMARY OF INVENTION

Technical Problem

By the way, when adopting the power transmission member being made of resin described above, there is a problem that the performance of the power transmission member is not stable depending on the usage environment such as performance fluctuation based on the water absorption characteristic of the resin, strength decrease in a low-temperature environment, and the like. Therefore, how to manufacture the power transmission member is an important technological development factor. However, the works of patent literature described above do not provide a detailed description of the power transmission member.

The present invention has been devised in view of such problems, and an object of the present invention is to provide a power transmission member, a pretensioner, a retractor, and a method for manufacturing a power transmission member, capable of stabilizing the performance regardless of the usage environment.

Solution to Problem

According to the present invention, provided is a power transmission member that is made of resin and transmits power to a gear while being plastically deformed, in which the power transmission member includes a base resin that has a water absorption characteristic that a water absorption rate is 1% or less when Method 1 of ISO 62 (a method for measuring a weight increasing rate after being immersed in water at 23° C. for 24 hours) is used and an elastomer that imparts mechanical characteristics, and as the mechanical characteristics, tensile yield stress (ISO 527) is 40 to 54 MPa, tensile fracture strain (ISO 527) is 50% or more, tensile elastic modulus (ISO 527) is 1200 to 1900 MPa, bending elastic modulus (ISO 178) is 1100 to 1700 MPa, and unnotched Charpy impact strength (ISO 179) is no fracture at −30° C. or higher.

Also, according to the present invention, provided is a pretensioner that includes a gear connected to a spool that winding a webbing that restrains an occupant and a power transmission member that transmits power to the gear while being plastically deformed in an emergency, in which the power transmission member includes a base resin that has a water absorption characteristic that a water absorption rate is 1% or less using Method 1 of ISO 62 (a method for measuring a weight increasing rate after being immersed in water at 23° C. for 24 hours) and an elastomer that imparts mechanical characteristics, and the mechanical characteristics are that tensile yield stress (ISO 527) is 40 to 54 MPa, tensile fracture strain (ISO 527) is 50% or more, tensile elastic modulus (ISO 527) is 1200 to 1900 MPa, bending elastic modulus (ISO 178) is 1100 to 1700 MPa, and unnotched Charpy impact strength (ISO 179) is no fracture at −30° C. or higher.

Also, according to the present invention, provided is a retractor that includes a spool that winds a webbing that restrains an occupant and a pretensioner that winds the webbing to remove slack in an emergency, in which the pretensioner includes a gear connected to the spool and a power transmission member that transmits power to the gear while being plastically deformed in an emergency, the power transmission member includes a base resin that has a water absorption characteristic that a water absorption rate is 1% or less using Method 1 of ISO 62 (a method for measuring a weight increasing rate after being immersed in water at 23° C. for 24 hours) and an elastomer that imparts mechanical characteristics, and the mechanical characteristics are that tensile yield stress (ISO 527) is 40 to 54 MPa, tensile fracture strain (ISO 527) is 50% or more, tensile elastic modulus (ISO 527) is 1200 to 1900 MPa, bending elastic modulus (ISO 178) is 1100 to 1700 MPa, and unnotched Charpy impact strength (ISO 179) is no fracture at −30° C. or higher.

In the power transmission member and pretensioner described above, the base resin may be a polyacetal homopolymer.

Also, according to the present invention, provided is a method for manufacturing a power transmission member that is made of resin and transmits power to a gear while being plastically deformed, and the method includes selecting a base resin using a water absorption characteristic as an index and determining a composition of an elastomer using mechanical characteristics as an index.

As for the water absorption characteristic, the water absorption rate may be 1% or less using Method 1 of ISO 62 (the method for measuring the weight increasing rate after being immersed in water at 23° C. for 24 hours). Further, the base resin may be a polyacetal homopolymer.

The mechanical characteristics may be that tensile yield stress (ISO 527) is 40 to 54 MPa, tensile fracture strain (ISO 527) is 50% or more, tensile elastic modulus (ISO 527) is 1200 to 1900 MPa, bending elastic modulus (ISO 178) is 1100 to 1700 MPa, and unnotched Charpy impact strength (ISO 179) is no fracture at −30° C. or higher.

Also, as for the water absorption characteristic, the water absorption rate may be 1% or less using Method 1 of ISO 62 (the method for measuring the weight increasing rate after being immersed in water at 23° C. for 24 hours), and the mechanical characteristics may be that tensile yield stress (ISO 527) is 40 to 54 MPa, tensile fracture strain (ISO 527) is 50% or more, tensile elastic modulus (ISO 527) is 1200 to 1900 MPa, bending elastic modulus (ISO 178) is 1100 to 1700 MPa, and unnotched Charpy impact strength (ISO 179) is no fracture at −30° C. or higher.

Advantageous Effects of Invention

According to the power transmission member, pretensioner, and retractor according to the present invention described above, a resin that has a low water absorption rate is selected as the base resin, and an elastomer is composed so as to satisfy the predetermined mechanical characteristics, so that it is possible to stabilize the performance of the power transmission member regardless of the usage environment.

Also, according to the method for manufacturing the power transmission member according to the present invention described above, under the presence of various factors related to the performance of the power transmission member, by selecting the base resin using the water absorption characteristic as an index and determining the composition of the elastomer using the mechanical characteristics as an index, it is possible to easily manufacture the power transmission member exhibiting stable performance.

BRIEF DESCRIPTION OF DRAWINGS

FIGS. 2(A) and 2(B) are explanatory diagrams illustrating an operation of a pretensioner, in which FIG. 2(A) illustrates an initial state and FIG. 2(B) illustrates an operation start state.

FIGS. 3(A) and 3(B) are explanatory diagrams illustrating an operation of the pretensioner, in which FIG. 3(A) illustrates an operating state and FIG. 3(B) illustrates a stopped state.

FIGS. 4(A) and 4(B) are diagrams illustrating a result of a material rigidity evaluation test, in which FIG. 4(A) illustrates an absolutely dry state and FIG. 4(B) illustrates a hygroscopic state.

DESCRIPTION OF EMBODIMENTS

Figure 1:
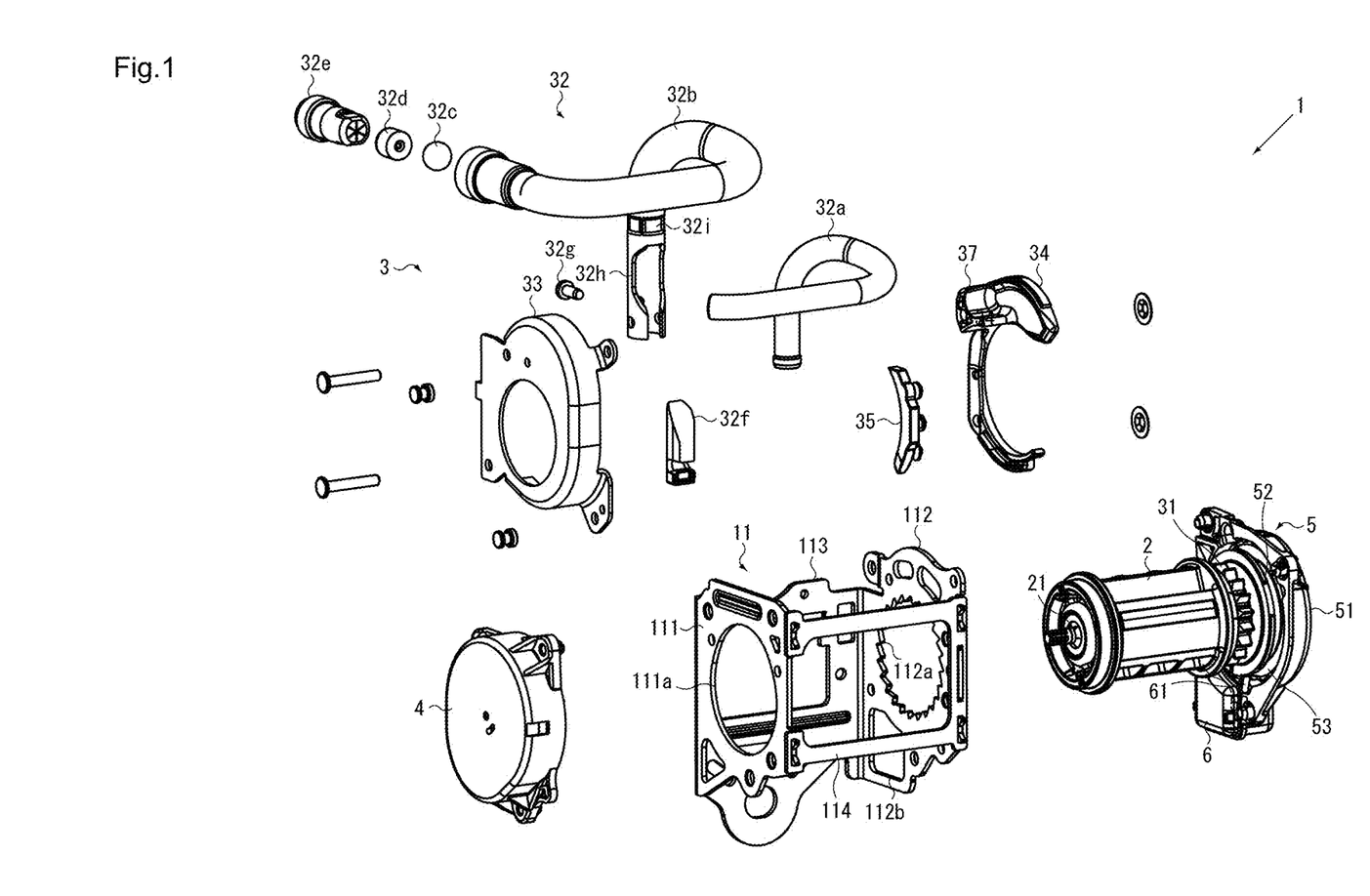
FIG. 1 is a component development view illustrating a retractor according to an embodiment of the present invention.
Figure 2A:
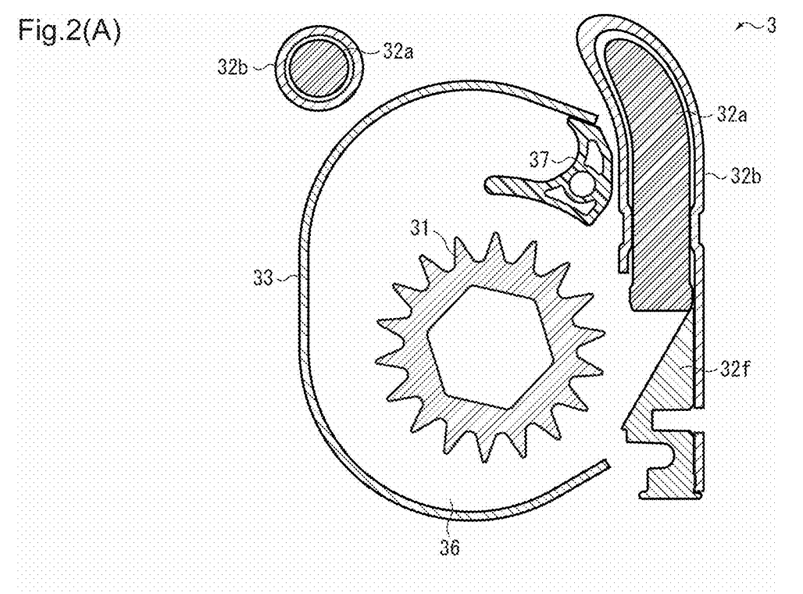
Figure 2B:
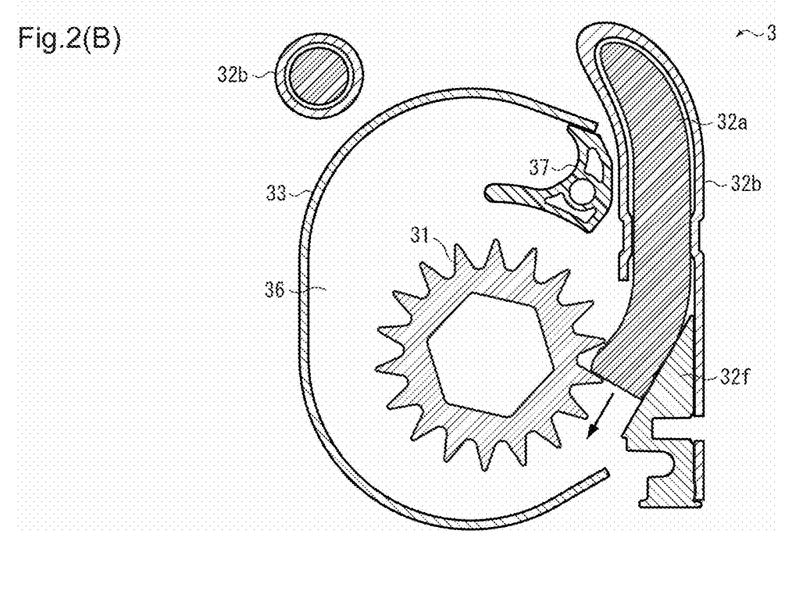
Figure 3A:
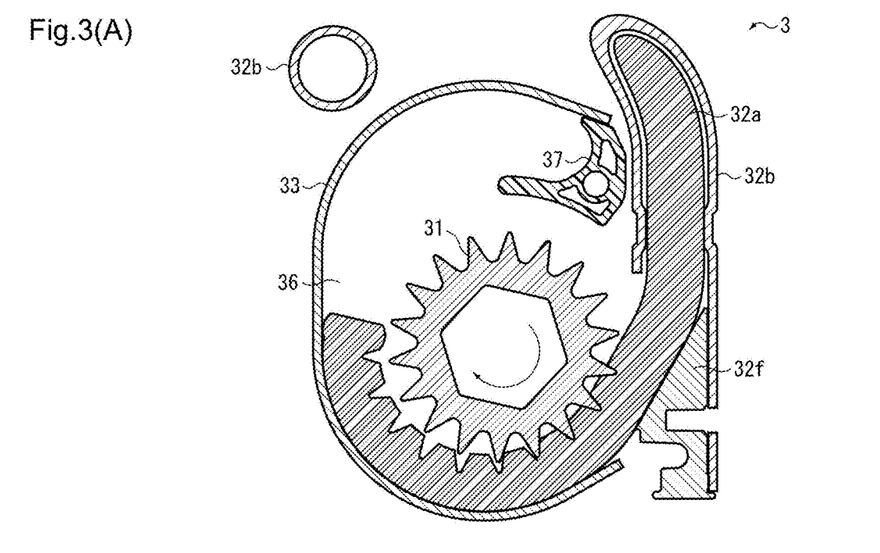
Figure 3B:
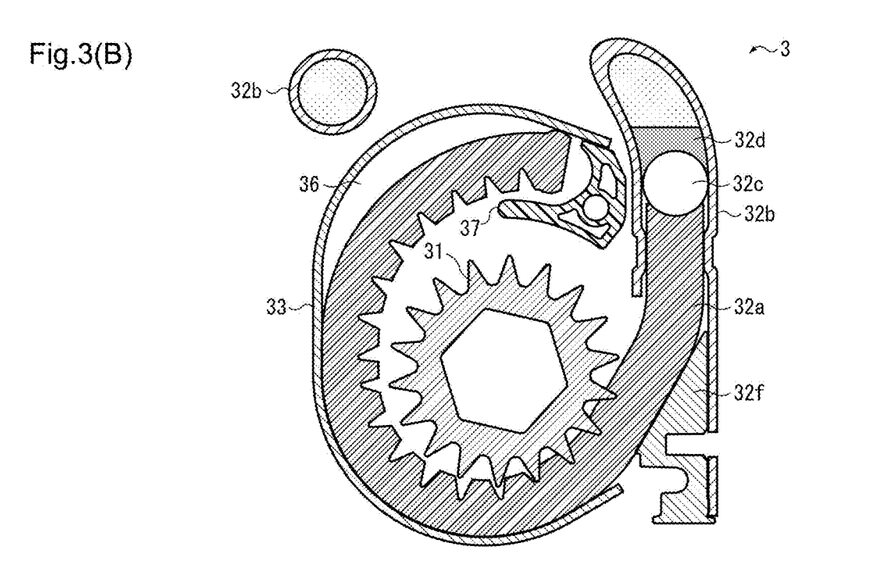

An embodiment of the present invention will be described below with reference to FIGS. 1 to 5. Here, FIG. 1 is a component development view illustrating a retractor including a pretensioner according to an embodiment of the present invention. FIGS. 2(A) and 2(B) are explanatory diagrams illustrating an operation of a pretensioner, in which FIG. 2(A) illustrates an initial state and FIG. 2(B) illustrates an operation start state. FIGS. 3(A) and 3(B) are explanatory diagrams illustrating an operation of the pretensioner, in which FIG. 3(A) illustrates an operating state and FIG. 3(B) illustrates a stopped state.

A retractor 1 illustrated in FIG. 1 includes a spool 2 that winds a webbing that restrains an occupant and a pretensioner 3 that winds the webbing to remove slack in an emergency, in which the pretensioner 3 includes a ring gear 31 connected to the spool 2 and a power transmission device 32 that transmits power to the ring gear 31 in an emergency. Note that, in FIG. 1, the webbing diagram is omitted.

The spool 2 is a winding cylinder that winds the webbing and is housed so as to be rotatable in a base frame 11 forming a skeleton of the retractor 1. The base frame 11 has, for example, a first end surface 111 and a second end surface 112 facing each other, and a side surface 113 connecting these end surfaces. The base frame 11 may include a tie plate 114 that faces the side surface 113 and is connected to the first end surface 111 and the second end surface 112.

Also, for example, a spring unit 4 is arranged on the first end surface 111 side, and the pretensioner 3 and a lock mechanism 5 are arranged on the second end surface 112 side. Note that the arrangement of the spring unit 4, the pretensioner 3, the lock mechanism 5, and the like is not limited to the configuration illustrated in the drawings.

Also, on the first end surface 111 of the base frame 11, an opening 111a through which a shaft portion of the spool 2 is inserted is formed, and on the second end surface 112 of the base frame 11, an opening 112a having internal teeth that can engage with a pawl (not illustrated in the drawings) of the lock mechanism 5 is formed. Also, a part of the pretensioner 3 (for example, the ring gear 31) is arranged inside the second end surface 112 of the base frame 11. Also, the lock mechanism 5 is arranged on the outside of the second end surface 112 of the base frame 11, and the lock mechanism 5 is housed in a retainer cover 51.

A vehicle sensor 6 that detects sudden deceleration or tilt of the vehicle body may be arranged on the retainer cover 51. The vehicle sensor 6 includes, for example, a spherical mass body (not illustrated in the drawings) and a sensor lever 61 that is swung by the movement of the mass body. The vehicle sensor 6 may be fitted and fixed in the opening 112b formed in the second end surface 112 of the base frame 11.

The spool 2 may have a cavity in the center and a torsion bar 21 forming an axial center may be inserted therethrough. The torsion bar 21 is connected to a locking base 52 of the lock mechanism 5 whose first end portion is connected to the end portion of the spool 2 and the second end portion is fixed to the spool 2 and is connected to a spring core of the spring unit 4.

Therefore, the spool 2 is connected to the spring unit 4 via the locking base 52 and the torsion bar 21 and is urged in the direction of winding the webbing by a spiral spring stored in the spring unit 4. Note that the means that applies the winding force to the spool 2 is not limited to the spring unit 4 and may be another means using an electric motor or the like.

The locking base 52 includes a pawl (not illustrated in the drawings) arranged so as to be able to appear from its side surface. When the lock mechanism 5 is activated, the pawl is projected from the side surface portion of the locking base 52 to engage with the internal teeth formed in the opening 112a of the base frame 11 and restrain the rotation of the locking base 52 in the webbing pull-out direction.

Therefore, even when a load is applied in the webbing pull-out direction while the lock mechanism 5 is activated, it is possible to hold the spool 2 in the non-rotating state until a load equal to or greater than a threshold value is applied to the torsion bar 21. Then, when a load equal to or greater than the threshold value is applied to the torsion bar 21, the torsion bar 21 is twisted so that the spool 2 relatively rotates and the webbing is pulled out.

Also, the lock mechanism 5 includes a lock gear 53 arranged so as to be adjacent to the locking base 52. The lock gear 53 includes a flywheel (not illustrated in the drawings) arranged so as to be swingable and, when webbing is faster than a normal pull-out speed, swings to engage with internal teeth formed on the retainer cover 51. When the vehicle sensor 6 is activated, the sensor lever 61 engages with external teeth formed on the side surface of the lock gear 53.

In this way, the rotation of the lock gear 53 is regulated by the operation of the flywheel or the vehicle sensor 6. Then, when the rotation of the lock gear 53 is regulated, a relative rotation occurs between the locking base 52 and the lock gear 53, and the pawl is projected from the side surface portion of the locking base 52 along with the relative rotation.

Note that the lock mechanism 5 is not limited to the configuration illustrated in the drawings, and it is possible to select and use various conventionally existing configurations arbitrarily. Also, the spool 2 may include a shock-absorbing mechanism constituted by a combination of a shaft and a wire-shaped or plate-shaped plastic deformation member instead of the torsion bar 21.

The pretensioner 3 includes, for example, a gear-shaped ring gear 31 having engaging teeth on the outer circumference, a power transmission device 32, a pretensioner cover 33 that stores the ring gear 31, a guide spacer 34 that forms a moving space for the power transmission member 32a, and a shaft guide 35 that regulates the radial movement of the ring gear 31.

The pretensioner cover 33, the guide spacer 34, and the shaft guide 35 are arranged inside the second end surface 112 of the base frame 11, and the guide spacer 34 and the shaft guide 35 are housed in the pretensioner cover 33. The ring gear 31 is arranged so as to be located in the space between the pretensioner cover 33 and the second end surface 112 secured by the guide spacer 34. Note that the ring gear 31 may also be referred to as a drive wheel or a rotating member.

The power transmission device 32 includes, for example, a power transmission member 32a that is made of resin and transmits power to the ring gear 31 (gear) while being plastically deformed, a pipe-shaped pressure vessel 32b that guides the power transmission member 32a to the ring gear 31, a stopper ball 32c arranged behind the power transmission member 32a, a piston 32d arranged behind the stopper ball 32c, a gas generator 32e arranged at the rear end portion of the pressure vessel 32b, and a guide block 32f that supports the power transmission member 32a when the power transmission member 32a starts engaging with the ring gear 31.

Also, in the power transmission device 32, for example, components are arranged in the order of the gas generator 32e, the piston 32d, the stopper ball 32c, and the elongated rod-shaped power transmission member 32a from the rear end to the tip of the pressure vessel 32b having an elongated shape. The power transmission member 32a, the stopper ball 32c, and the piston 32d are housed in the pressure vessel 32b and move in the pressure vessel 32b by a working gas generated from the gas generator 32e arranged at the rear end of the pressure vessel 32b.

The pressure vessel 32b passes through, for example, the upper part of the first end surface 111, the upper part of the tie plate 114, and the upper part of the second end surface 112, as illustrated in FIG. 1 and is arranged so as to extend downward from the upper part inside the corner part formed by the second end surface 112 and the side surface 113.

The guide block 32f is arranged at the tip of the pressure vessel 32b. Also, at the tip of the pressure vessel 32b, an opening 32h is formed to discharge the power transmission member 32a guided by the guide block 32f from the pressure vessel 32b into the space formed by the pretensioner cover 33 and the guide spacer 34. The guide block 32f is fixed to the pressure vessel 32b and the side surface 113 by, for example, a bolt 32g.

A reduced diameter portion 32i in which the cross-sectional area of the pressure vessel 32b is partially reduced may be formed at the tip of the pressure vessel 32b and in front of (rear end side) the opening 32h. The reduced diameter portion 32i is formed, for example, by drawing all or a part of the outer circumference of the pressure vessel 32b. Note that, although not illustrated in the drawings, it is also possible to form the reduced diameter portion 32i using a metal fitting such as a bolt, a rivet, or the like or a tubular member separate from the pressure vessel 32b.

When the pretensioner 3 is activated, the stopper ball 32c collides with the reduced diameter portion 32i to stop it, and the piston 32d seals the gap between the stopper ball 32c and the pressure vessel 32b to suppress the external release of the working gas.

Here, the operation of the pretensioner 3 described above will be described with reference to FIGS. 2(A) to 3(B). As illustrated in FIG. 2(A), the power transmission member 32a is housed in the pressure vessel 32b in the initial state that is the state before the pretensioner 3 is activated. At this time, the tip of the power transmission member 32a may be arranged at a position adjacent to the guide block 32f.

Also, in the pretensioner cover 33, a passage 36 that is a space through which the power transmission member 32a can pass when the pretensioner 3 is activated is formed. The passage 36 is formed by the ring gear 31, a pretensioner cover 33, a guide spacer 34, a guide block 32f, and the like. It is also possible to arrange a stopper 37 at the end of the passage 36.

In an emergency such as a vehicle collision and the like, the pretensioner 3 is activated, the working gas is supplied from the gas generator 32e into the pressure vessel 32b, and the power transmission member 32a is pushed out via the piston 32d and the stopper ball 32c to move inside the pressure vessel 32b.

The power transmission member 32a extruded in the pressure vessel 32b, as illustrated in FIG. 2(B), moves along the surface of the guide block 32f, reaches a position where it collides with the engaging teeth of the ring gear 31, and rotates the ring gear 31.

After that, as illustrated in FIG. 3(A), the power transmission member 32a moves along the passage 36 while being plastically deformed by the engaging teeth of the ring gear 31 and transmits power to the ring gear 31.

Then, as illustrated in FIG. 3(B), the power transmission member 32a stops when finishing winding up the slack of the webbing. Note that the power transmission member 32a may collide with the stopper 37 arranged at the end of the passage 36 to stop in some cases.

The power transmission member 32a described above is a component that rotates the ring gear 31 (gear) coaxially connected to the spool 2 in order to wind the slack of the webbing, and a large load is applied to the power transmission member 32a. Therefore, it must have rigidity or strength that can withstand the load during activation of the pretensioner 3. On the other hand, the power transmission member 32a also needs to have softness enough to be plastically deformable by the ring gear 31 without being clogged in the passage 36.

Also, since the power transmission member 32a is an in-vehicle component, it must operate stably in the temperature range of −35° C. to +85° C. Also, since the power transmission member 32a is made of resin, it must be a material that takes into consideration changes in humidity, deterioration over time, and the like. In particular, the resin has a property that the rigidity or strength tends to decrease depending on the amount of water absorption.

As a result of diligent research, the present inventors have come to develop a power transmission member that satisfies these conditions. Specifically, the power transmission member 32a according to the present embodiment includes a base resin that has a water absorption characteristic that a water absorption rate is 1% or less when Method 1 of ISO 62 (a method for measuring a weight increasing rate after being immersed in water at 23° C. for 24 hours) is used and an elastomer that imparts mechanical characteristics to the power transmission member 32a. Note that the power transmission member 32a may contain other additives such as a stabilizer, a flame retardant, an antistatic agent, a lubricant, and the like.

The mechanical characteristics required for the power transmission member 32a are tensile yield stress (ISO 527) is 40 to 54 MPa, tensile fracture strain (ISO 527) is 50% or more, tensile elastic modulus (ISO 527) is 1200 to 1900 MPa, bending elastic modulus (ISO 178) is 1100 to 1700 MPa, and unnotched Charpy impact strength (ISO 179) is no fracture at −30° C. or higher. Note that "ISO" is an abbreviation for International Organization for Standardization, and the numbers following it mean the number of the international standard.

The power transmission member 32a is manufactured by selecting a base resin using the water absorption characteristics described above as an index and determining the composition of the elastomer using the mechanical characteristics described above as an index.

The base resin is, for example, a polyacetal homopolymer. Also, the elastomer is a general term for polymer materials having rubber elasticity. As the elastomer, for example, it is possible to use a thermosetting elastomer having heat resistance that is hard to be softened by heat. Note that the elastomer can be arbitrarily selected from various commercially available elastomers as long as it can satisfy the mechanical characteristics described above.

Figure 4A:
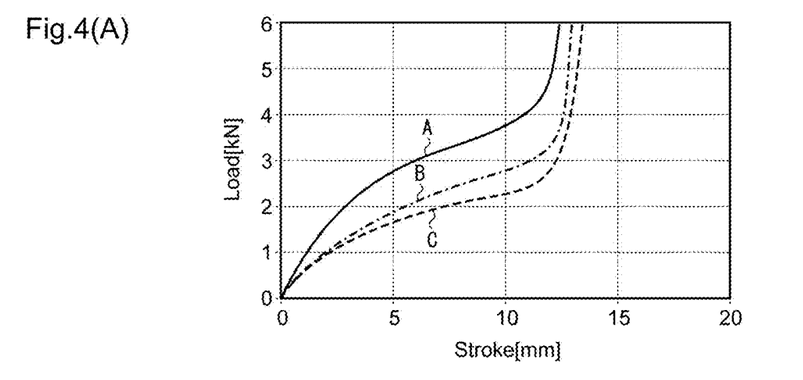
Figure 4B:
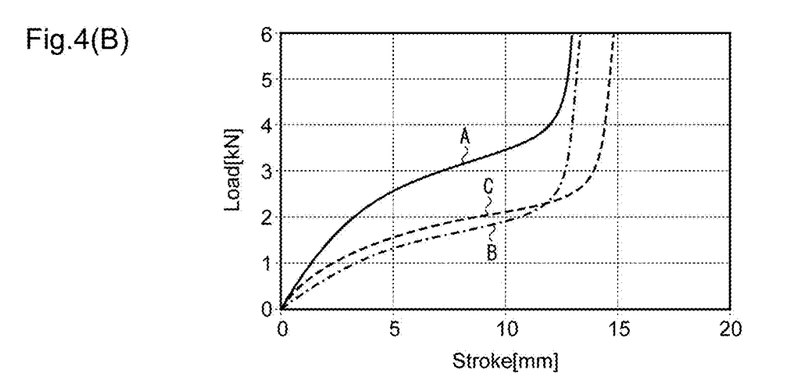

Here, FIGS. 4(A) and 4(B) are diagrams illustrating a result of a material rigidity evaluation test, in which FIG. 4(A) illustrates an absolutely dry state and FIG. 4(B) illustrates a hygroscopic state. In each of the drawings, the horizontal axis indicates the stroke of the load-loading device (displacement of the specimen) [mm], and the vertical axis indicates the load of the load-loading device [kN].

The material rigidity evaluation test is a test that a steel pipe with an inner diameter of 11 mm and a height of 80 mm is erected on a substrate, a resin rod with a diameter of 9.6 mm and a length of 50 mm is inserted into the pipe, and fluctuation of the load is measured when applying the load by using a load-loading device (for example, a hydraulic cylinder or the like) from above so that the resin rod is to be displaced at a speed of 1 mm/s. The numerical value of the load obtained by the material rigidity evaluation test means the rigidity of the specimen.

A specimen A uses the resin constituting the power transmission member 32a according to the present embodiment, and the test results are indicated by solid lines. A specimen B uses polyamide 66 (PA 66) as a comparative example 1, and the test results are indicated by an alternate long and short dashed line. A specimen C uses polyamide 12 (PA 12) as a comparative example 2, and the test results are indicated by dotted lines.

Note that as the water absorption characteristic of the specimen A, a water absorption rate is 0.9% when Method 1 of ISO 62 is used, as the water absorption characteristic of the specimen B, a water absorption rate is 5.5% when Method 1 of ISO 62 is used, and as the water absorption characteristic of the specimen C, a water absorption rate is 1.2% when Method 1 of ISO 62 is used.

The material rigidity evaluation test in the absolute dry state illustrated in FIG. 4(A) is a material rigidity evaluation test conducted in an environment of 80° C. As illustrated in FIG. 4(A), it is indicated that the specimen A formed of the resin constituting the power transmission member 32a according to the present embodiment has a higher absolute value of rigidity compared to the specimen B and the specimen C.

The material rigidity evaluation test in the hygroscopic state illustrated in FIG. 4(B) is a material rigidity evaluation test carried out in an environment of 80° C. using a specimen saturated with water absorption in an environment of temperature 80° C. and humidity 95%. As illustrated in FIG. 4(B), the rigidity of the specimen B and the specimen C after absorbing moisture is greatly reduced, whereas it can be seen that the decrease in rigidity of the specimen A formed of the resin constituting the power transmission member 32a according to the present embodiment is extremely small.

Figure 5:
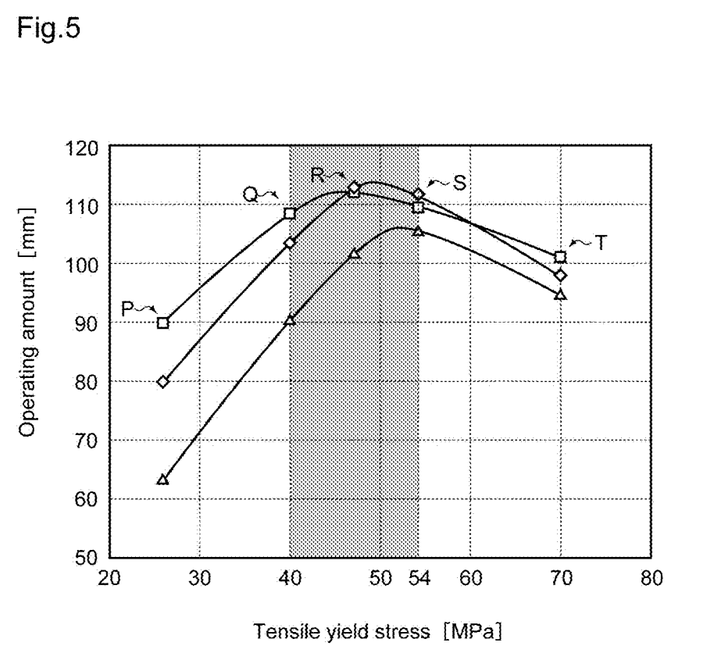
FIG. 5 is a diagram illustrating a relationship between a tensile yield stress of a power transmission member and an operating amount of the pretensioner when the pretensioner is activated.

Next, the tensile yield stress, which is an important index among the mechanical characteristics described above, will be examined. Here, FIG. 5 is a diagram illustrating a relationship between a tensile yield stress of a power transmission member and an operating amount of the pretensioner when the pretensioner is activated. In the test results illustrated in FIG. 5, the horizontal axis indicates the tensile yield stress [MPa] of the power transmission member 32a, and the vertical axis indicates the operating amount [mm] of the pretensioner 3.

The test results illustrated in FIG. 5 are the results of creating test specimens P to T of the power transmission member 32a including a base resin that has a water absorption characteristic that a water absorption rate is 1% or less when Method 1 of ISO 62 is used and an elastomer that imparts mechanical characteristics to the power transmission member 32a, conducting an actual machine test, and measuring an operating amount of the pretensioner 3.

Here, the specimen P has a tensile yield stress of 26 MPa (ISO 527), the specimen Q has a tensile yield stress of 40 MPa (ISO 527), the specimen R has a tensile yield stress of 47 MPa (ISO 527), the specimen S has a tensile yield stress of 54 MPa (ISO 527), and the specimen T has a tensile yield stress of 70 MPa (ISO 527). Note that each of the specimens P to T satisfies the condition that tensile fracture strain (ISO 527) is 50% or more, tensile elastic modulus (ISO 527) is 1200 to 1900 MPa, bending elastic modulus (ISO 178) is 1100 to 1700 MPa, and unnotched Charpy impact strength (ISO 179) is no fracture at −30° C. or higher.

Then, each specimen P to T is tested under three different temperature environments (low-temperature environment, normal temperature environment, and high-temperature environment), and the test results under the low-temperature environment (−40° C. atmosphere) are indicated by square symbols, the test results under the normal temperature environment (22° C. atmosphere) are indicated by rhombus symbols, and the test results under the high-temperature environment (80° C. atmosphere) are indicated by triangle symbols. FIG. 5 illustrates approximate curves indicating the relationship between the tensile yield stress of the power transmission member 32a and the operating amount of the pretensioner 3 under each temperature environment from these test results.

In the actual machine test of the power transmission member 32a, it was investigated whether or not the power transmission member 32a was damaged after the test. As a result, it was found that the power transmission member 32a was damaged with the specimen P and the specimen T in all the temperature environments, and the power transmission member 32a was not damaged with the specimen Q, the specimen R, and the specimen S in all the temperature environments.

In addition to these test results, in consideration of the high possibility that the operating amount of the pretensioner is required to be 90 [mm] or more, the lower limit of the tensile yield stress of the power transmission member 32a can be set to 40 [MPa]. Also, considering that, when the tensile yield stress of the power transmission member 32a is high, there is a problem that it is difficult to insert it into the pressure vessel 32b having the curved pipe shape, the upper limit of the tensile yield stress of the power transmission member 32a can be set to 54 [MPa]. Therefore, the tensile yield stress of the power transmission member 32a according to the present embodiment is set in the range of 40 [MPa] or more and 54 [MPa] or less (the range painted in gray in the drawing).

According to the power transmission member 32a according to the present embodiment described above, a resin that has a low water absorption rate is selected as the base resin, and an elastomer is composed so as to satisfy predetermined mechanical characteristics, whereby it is possible to stabilize the performance of the power transmission member 32a irrespective of the usage environment.

Also, according to the method for manufacturing the power transmission member 32a according to the present embodiment described above, under the presence of various factors related to the performance of the power transmission member 32a, by selecting the base resin using the water absorption characteristic as an index and determining the composition of the elastomer using the mechanical characteristics as an index, it is possible to easily manufacture the power transmission member 32a exhibiting stable performance.

The present invention is not limited to the embodiment described above, and it goes without saying that various modifications can be made without departing from the spirit and scope of the present invention.

REFERENCE SIGNS LIST

1 Retractor
2 Spool
3 Pretensioner
4 Spring unit
5 Lock mechanism
6 Vehicle sensor
11 Base frame
21 Torsion bar
31 Ring gear (gear)
32 Power transmission device
32a Power transmission member
32b Pressure vessel
32c Stopper ball
32d Piston
32e Gas generator
32f Guide block
32g Bolt
32h Opening
32i Reduced diameter portion
33 Pretensioner cover
34 Guide spacer
35 Shaft guide
36 Passage
37 Stopper
51 Retainer cover
52 Locking base
53 Lock gear
61 Sensor lever
111 First end surface
111a Opening
112 Second end surface
112a, 112b Opening
113 Side surface
114 Tie plate

The invention claimed is:

1. A power transmission member that is made of resin and transmits power to a gear while being plastically deformed, the power transmission member comprising:
a base resin that has a water absorption characteristic that a water absorption rate is 1% or less when a Method 1 of ISO 62 including measuring a weight increasing rate after immersed in water at 23 C for 24 hours is used; and an elastomer that imparts mechanical characteristics, wherein
as the mechanical characteristics, tensile yield stress (ISO 527) is 40 to 54 MPa, tensile fracture strain (ISO 527) is 50% or more, tensile elastic modulus (ISO 527) is 1200 to 1900 MPa, bending elastic modulus (ISO 178) is 1100 to 1700 MPa, and unnotched Charpy impact strength (ISO 179) is no fracture at −30° C. or higher.

2. The power transmission member according to claim 1, wherein the base resin is a polyacetal homopolymer.

3. A pretensioner comprising: a gear connected to a spool that winds a webbing that restrains an occupant; and a power transmission member that transmits power to the gear while being plastically deformed in an emergency, wherein the power transmission member is the power transmission member according to claim 2.

4. A retractor comprising: a spool that winds a webbing that restrains an occupant; and a pretensioner that winds the webbing to remove slack in an emergency, wherein
the pretensioner includes the power transmission member according to claim 2.

5. A pretensioner comprising: a gear connected to a spool that winds a webbing that restrains an occupant; and a power transmission member that transmits power to the gear while being plastically deformed in an emergency, wherein
the power transmission member is the power transmission member according to claim 1.

6. A retractor comprising: a spool that winds a webbing that restrains an occupant; and a pretensioner that winds the webbing to remove slack in an emergency, wherein
the pretensioner includes the power transmission member according to claim 1.

7. A method for manufacturing a power transmission member that is made of resin and transmits power to a gear while being plastically deformed, the method comprising:
selecting a base resin using a water absorption characteristic as an index; and
determining a composition of an elastomer using mechanical characteristics as an index,
wherein as the water absorption characteristic, a water absorption rate is 1% or less when a Method 1 of ISO 62 including measuring a weight increasing rate after immersed in water at 23 C for 24 hours is used.

8. The method for manufacturing a power transmission member according to claim 7, wherein the base resin is a polyacetal homopolymer.

9. The method for manufacturing a power transmission member according to claim 7, wherein, as the mechanical characteristics, tensile yield stress (ISO 527) is 40 to 54 MPa, tensile fracture strain (ISO 527) is 50% or more, tensile elastic modulus (ISO 527) is 1200 to 1900 MPa, bending elastic modulus (ISO 178) is 1100 to 1700 MPa, and unnotched Charpy impact strength (ISO 179) is no fracture at −30° C. or higher.

10. The method for manufacturing a power transmission member according to claim 7, wherein, as the water absorption characteristic, a water absorption rate is 1% or less when a Method 1 of ISO 62 including measuring a weight increasing rate after immersed in water at 23 C for 24 hours is used, and, as the mechanical characteristics, tensile yield stress (ISO 527) is 40 to 54 MPa, tensile fracture strain (ISO 527) is 50% or more, tensile elastic modulus (ISO 527) is 1200 to 1900 MPa, bending elastic modulus (ISO 178) is 1100 to 1700 MPa, and unnotched Charpy impact strength (ISO 179) is no fracture at −30° C. or higher.

* * * * *